United States Patent [19]

Sugawara et al.

[11] Patent Number: 5,342,003
[45] Date of Patent: Aug. 30, 1994

[54] SPINNING REEL

[75] Inventors: Kenichi Sugawara; Takeshi Ikuta; Osamu Yoshikawa, all of Sakai, Japan

[73] Assignee: Shimano Inc., Osaka, Japan

[21] Appl. No.: 771,226

[22] Filed: Oct. 4, 1991

[30] Foreign Application Priority Data

Oct. 9, 1990 [JP] Japan .................. 2-106077[U]
Oct. 9, 1990 [JP] Japan .................. 2-106078[U]
Nov. 20, 1990 [JP] Japan .................. 2-122194[U]

[51] Int. Cl.5 .............................................. A01K 89/01
[52] U.S. Cl. ........................................ 242/231; 43/19; 242/233
[58] Field of Search ................. 43/19; 242/323, 230, 242/231, 232, 233

[56] References Cited

U.S. PATENT DOCUMENTS

| 2,225,719 | 12/1940 | Shotton | 242/301 |
| 2,736,979 | 3/1956 | Le Gal | 242/233 |
| 2,963,238 | 12/1960 | Gaire | 242/323 |
| 3,142,127 | 7/1964 | Mason | 43/19 |
| 3,166,894 | 1/1964 | Rule | 242/323 |
| 4,014,126 | 3/1977 | Samuels | 43/19 |
| 4,747,559 | 5/1988 | Hitomi | 242/233 |
| 4,845,879 | 7/1989 | Urso | 43/19 |

FOREIGN PATENT DOCUMENTS 61-186361 11/1986 Japan .

*Primary Examiner*—Katherine Matecki
*Attorney, Agent, or Firm*—Dickstein, Shapiro & Morin

[57] ABSTRACT

A spinning reel includes a pair of arms formed on a rotor disposed in a forward portion of a reel body. At least one of the arms carries an oscillatable arm, and a bail arm extends between the oscillatable arm and the other arm or an oscillatable arm attached to the other arm to be switchable between a line winding position and a line freeing position. A bail engaging element is formed on the oscillatable arm or a member oscillatable with the oscillatable arm. The bait engaging element is operable to hold a bait against a forward tension when the bail arm is set to the line winding position, and to release the bait forwardly when the bail arm is set to the line freeing position.

2 Claims, 13 Drawing Sheets

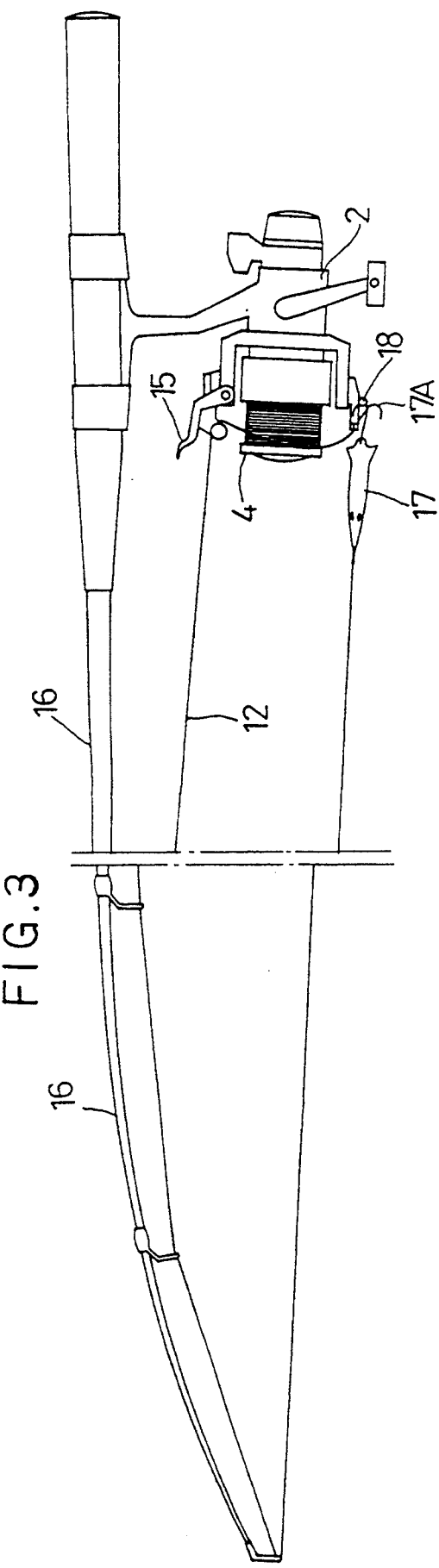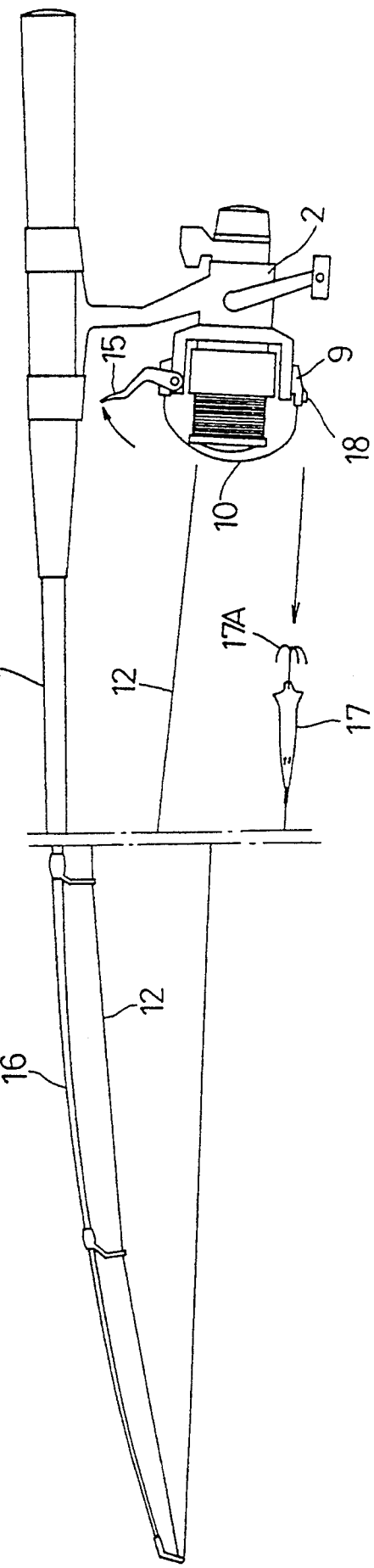

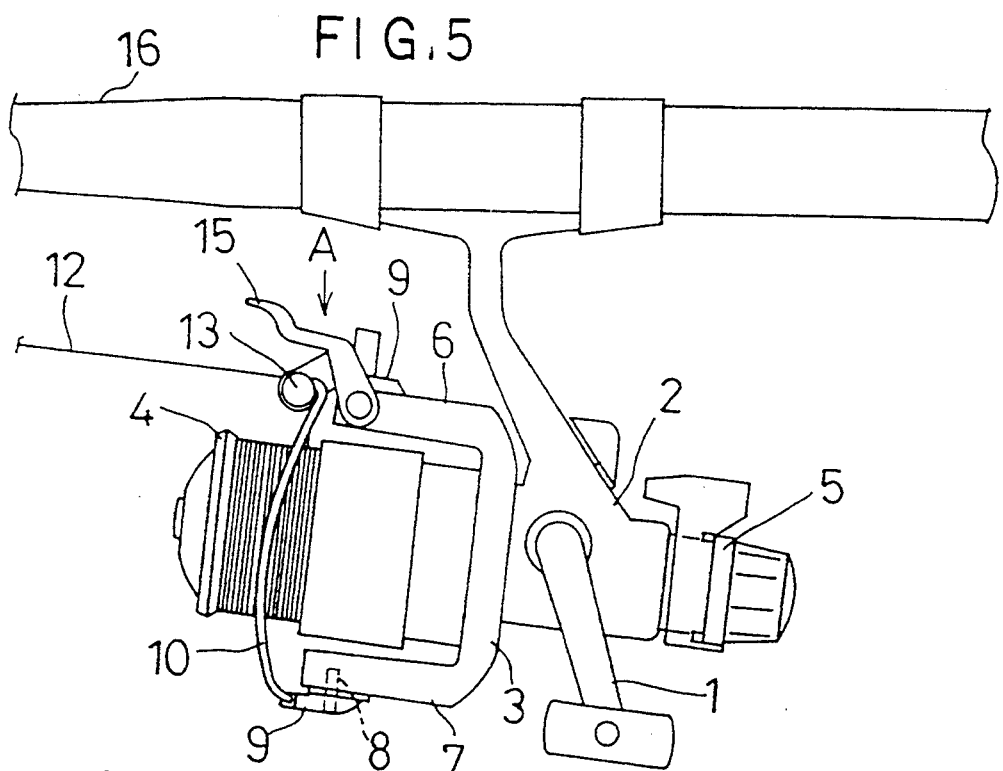
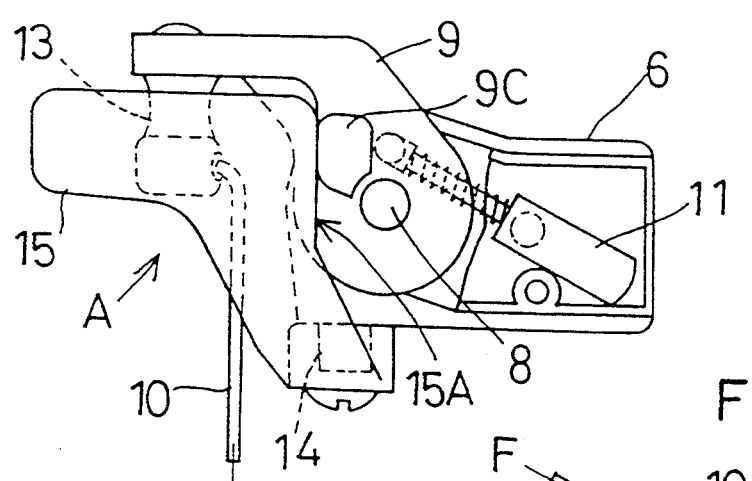
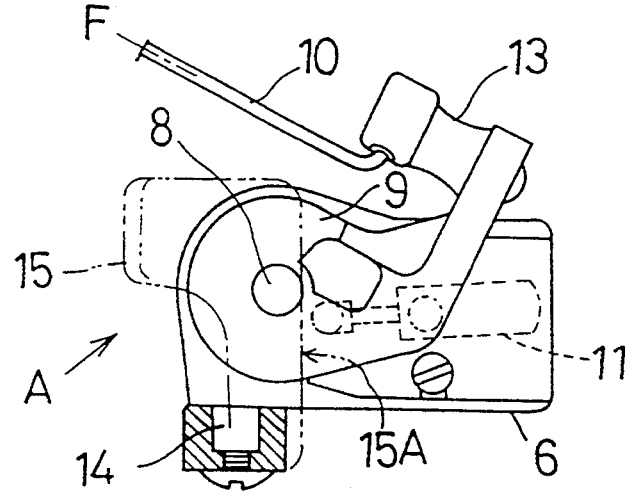

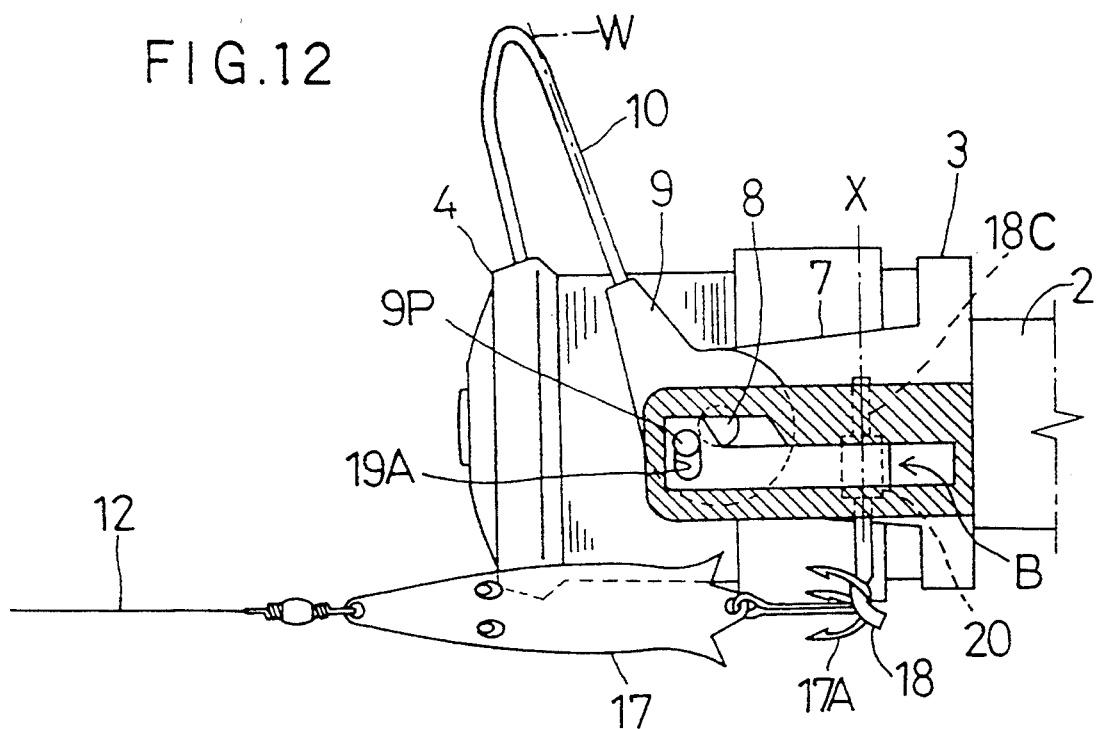
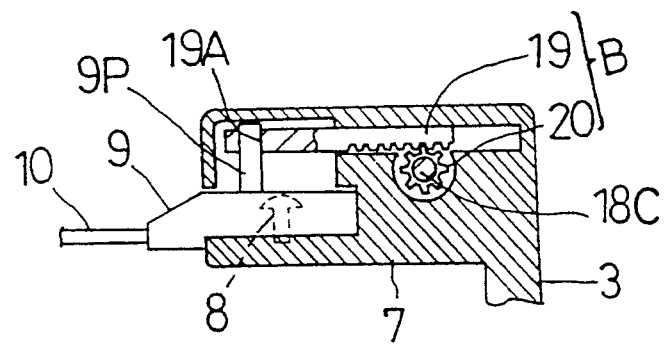
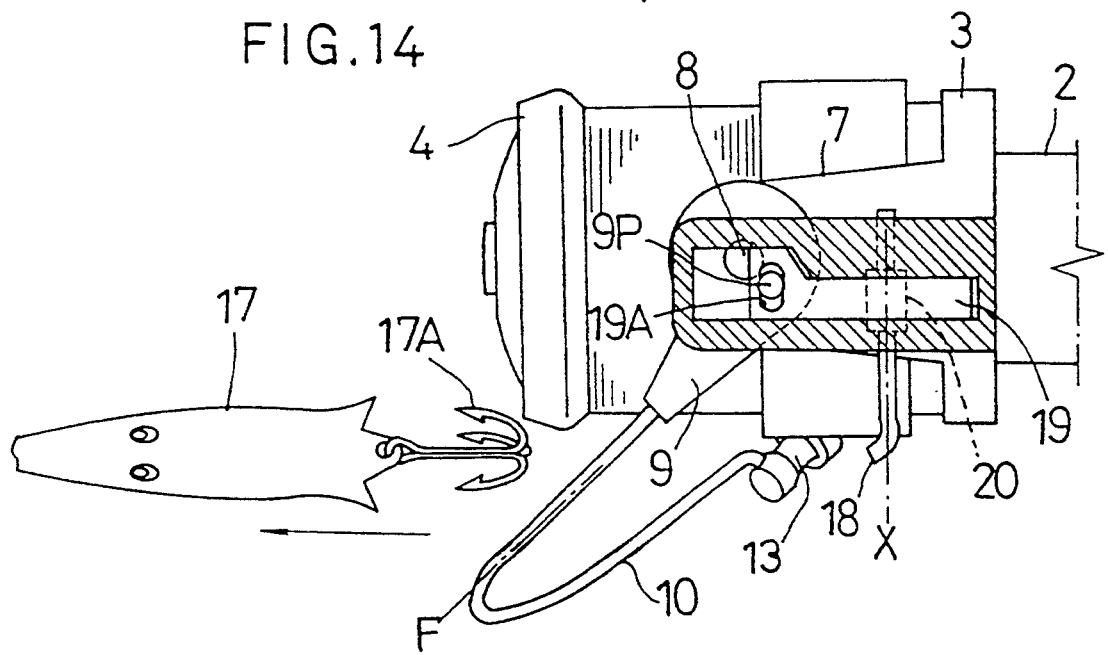

SPINNING REEL

BACKGROUND OF THE INVENTION

1. Field of the Invention

This invention relates to a spinning reel, and more particularly to the technique of aiding casting of a lure or other bait by means of a spinning reel. The spinning reel has a pair of arms formed on a rotor mounted in a forward position of a reel body, an oscillatable arm attached to at least one of the arms, and a bail arm extending between the oscillatable arm and the other arm or an oscillatable arm attached to the other arm. The bail arm is switchable between a line winding position and a line freeing position.

2. Description of the Related Art

Spinning reels having a switchable bail arm as above are in common use. A known example of such spinning reels includes a control device for reducing the trouble of switching the bail arm to the free position at a casting time, as disclosed in Japanese Utility Model Publication Kokai No. 1986-186361, for example. However, there has been no spinning reel that includes a device for aiding casting of a lure or other bait.

When casting a lure in lure fishing, the angler swings a fishing rod with the bail arm set to the free position.

At this time the angler swings the rod in one of various throwing modes such as an overthrow or side throw, depending on a target point position, and geography around the target point including trees. However, in bass fishing or other type of fishing frequently involving casting from a boat relatively close to a shore, branches of trees may overhang the anglers or tall bushes may lie ahead. In such a situation, precise casting to a target point is impaired by contact between the fishing rod and the branches or bushes and, what is worse, the rod or lure may be damaged. In this sense, there is room for improvement.

SUMMARY OF THE INVENTION

The object of the present invention is to provide an improved spinning reel capable of aiding casting to a target point even in a situation in which control of the fishing rod is difficult.

In order to fulfill the above object, the present invention provides a fishing reel having a bail arm switchable with oscillations of the oscillatable arm as noted in the outset hereof, the fishing reel including a bait engaging element formed on the oscillatable arm or a member oscillatable with the oscillatable arm, wherein the bait engaging element is operable to hold a bait against a forward tension when the bail arm is set to a line winding position, and to release the bait forwardly when the bail arm is set to a line freeing position.

The functions and advantages of the present invention will be described with reference to FIGS. 1 through 7. When a bait is cast in a situation where it is difficult to swing a rod 16, as shown in FIG. 3, a bait hook 17A is engaged with an engaging element 18 with the fishing rod 16 elastically deformed in a bending direction and a fishing line 12 under tension.

In the embodiments to the described later, the hook 17A, which is an intrinsic part of a lure, i.e. one example of baits 17, is engaged with the engaging element 18. However, the bait 17 may include a device provided specially for engagement with the engaging element 18.

An amount of elastic deformation of the fishing rod 16 is set the greater for the longer casting distance.

Next, a tip end of the fishing rod 16 is directed toward a target point, and the bail arm 10 is switched to the line freeing position. Then the hook 17A is allowed to disengage forwardly from the engaging element 18, and thereafter the fishing line 12 becomes free. Consequently, the bait 17 is thrown forward by the elastic restoring force of the fishing rod 16.

According to the present invention, therefore, the engaging element 18 formed on the reel allows casting to be carried out utilizing the elasticity of the fishing rod 16 without swinging the fishing rod 16.

This spinning reel with the very simple improvement, i.e. formation of the engaging element, is capable of aiding casting to a target point even in a situation where it is difficult to swing the fishing rod.

In particular, the invention allow adjustment of a casting distance to be effected by adjusting a bending amount of the fishing rod. Further, the invention enables a beginner to handle the fishing rod with ease since casting describes a linear locus longitudinally of the rod.

Other features and advantages of the present invention will be apparent from the following description.

BRIEF DESCRIPTION OF THE DRAWINGS

The drawings show spinning reels according to the present invention, in which:

FIGS. 3 and 4 are side view showing a pre-casting state and a post-casting state, respectively, FIG. 5 is a side view of a spinning reel, FIGS. 6 and 7 are plan views of a switching control mechanism in a pre-switching state and a post-switching state, respectively.

FIG. 12 is a view showing a spinning reel in another embodiment including an interlocking device with a bail arm in a line winding position, FIG. 13 is a sectional view of the interlocking device with the bail arm in the line winding position, FIG. 14 is a view showing the interlocking device with the bail arm in a line freeing position.

DETAILED DESCRIPTION OF THE PREFERRED EMBODIMENTS

Figure 1:
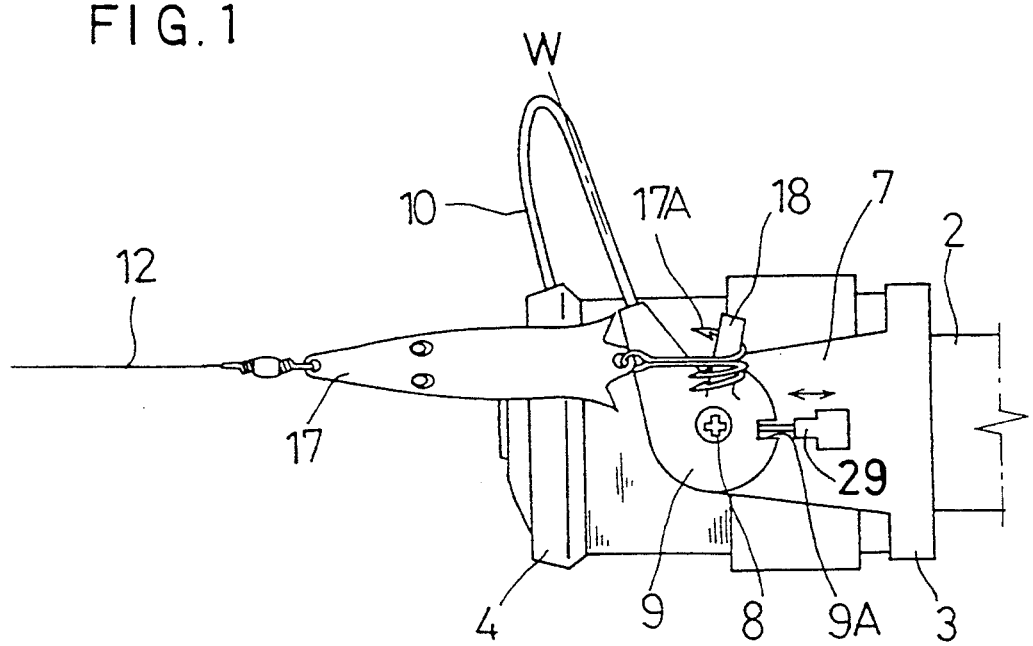
FIG. 1 is a view showing an engaging element with a bail arm in a line winding position.

A spinning reel according to the present invention will be described in detail with reference to the drawings.

Referring to FIGS. 5 through 7, the spinning reel includes a handle 1 attached to a reel body 2 having a rotor 3 and a spool 4 disposed forwardly and a drag device 5 disposed rearwardly thereof. The rotor 3 includes a first arm 6 and a second arm 7 each carrying an oscillatable arm 9 which is oscillatable about an axis 8. A bail arm 10 extends between the oscillatable arms 9 to be switchable with oscillations of the osicllatable arms 9 between a line winding position W and a line freeing position F.

As shown in FIG. 6, the first arm 6 contains a toggle mechanism 11 for maintaining the bail arm 10 in the winding position W or freeing position F. Further, the first arm 6 includes a switching control mechanism A for switching the bail arm 10 to the freeing position F. The first arm 6 also includes a line roller 13 for guiding a fishing line 12.

The switching control mechanism A includes a lever 15 pivotable about an axis 14, and a cam 9C formed on the oscillatable arm 9. In the position shown in FIGS. 5 and 6, the angler may pull the lever 15 upward with his or her finger. Then a pressing surface 15A of the lever 15 contacts the cam 9C and applies a torque to the oscillatable arm 9, thereby to switch the bail arm 10 to the freeing position F.

FIGS. 1 through 4 show the above spinning reel attached to a lure rod 16 which is one example of fishing rods. As an aid in casting a lure 17 (one example of baits) utilizing elasticity of the lure rod 16, the spinning reel includes an engaging element 18 formed integral with the oscillatable arm 9 connected to the second arm 7.

Figure 2:
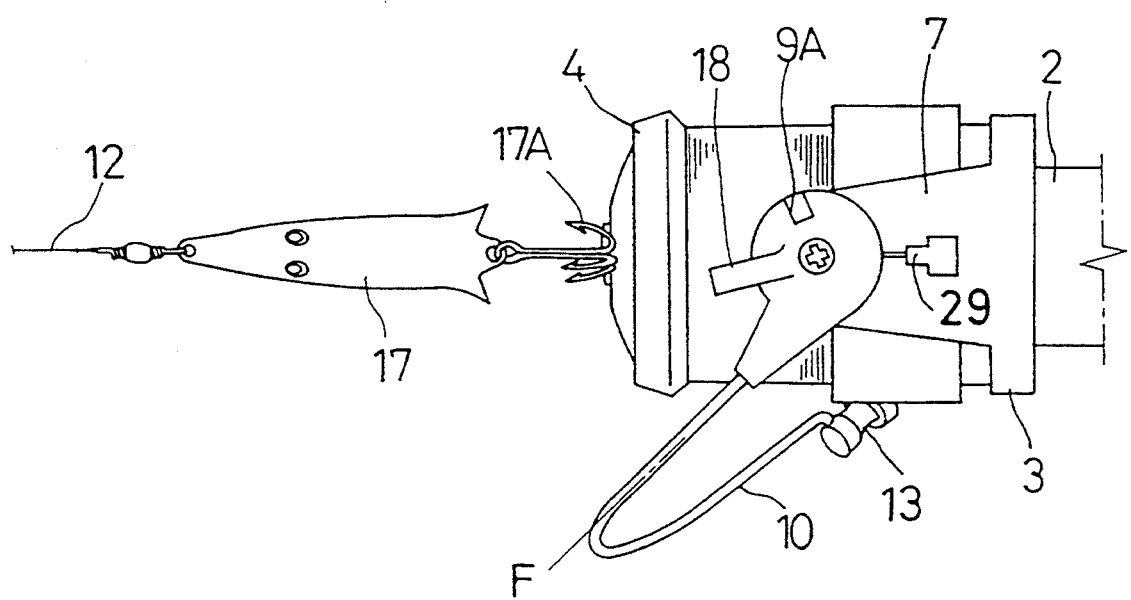
FIG. 2 is a view showing the engaging element with the bail arm in a line freeing position.

When the bail arm 10 is set to the winding position W, as shown in FIG. 1, the engaging element 18 holds a hook 17A of the lure 17 with a forward tension acting on the lure 17. When the bail arm 10 is set to the freeing position F, as shown in FIG. 2, the oscillatable arm 9 and engaging element 18 are moved to a position to release the hook 17A of the lure 17 forwardly. For using this engaging element 18 in aid of casting, as shown in FIG. 3, the hook 17A is engaged with the engaging element 18 with the lure rod 16 elastically deformed in a bending direction and the fishing line 12 under tension. In this state, a tip end of the lure rod 16 is directed toward a target point, and the lever 15 of the switching control mechanism A is raised. Consequently, when the bail arm 10 is switched from the winding position W to the freeing position F, the lure 17 becomes disengaged to set the fishing line 12 free. The lure 17 is then thrown substantially straight forward.

This fishing reel further includes a lock piece 29 slidable relative to the second arm 7 to engage a recess 9A defined in the oscillatable arm 9. This construction prevents inadvertent casting due to an external shock or the like occurring while the engaging element 18 engages the hook 17A of the lure 17.

Figure 8:
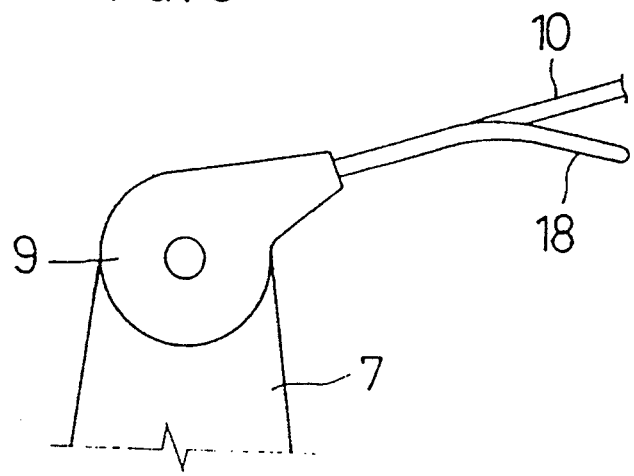
FIGS. 8 and 9 are a side view and a front view of modified engaging elements formed on the bail arms.
Figure 9:
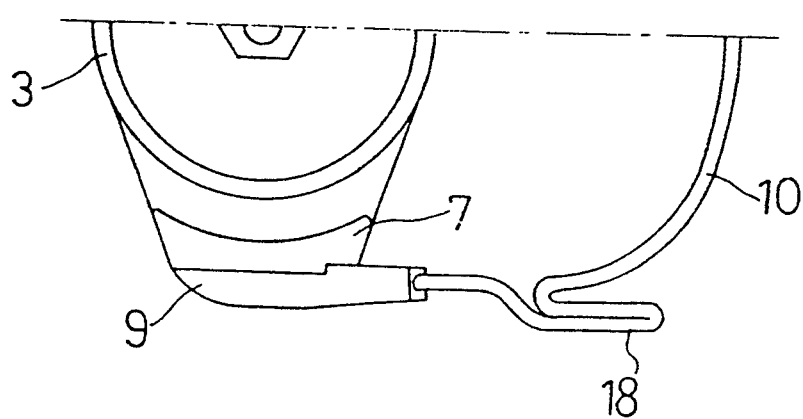

The above embodiment may be modified as follows:

(a) As shown in FIGS. 8 and 9, part of the bail arm 10 is bent to define an engaging element 18.

Figure 10:
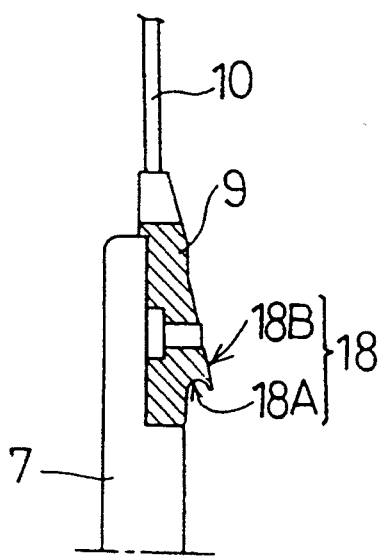
FIGS. 10 and 11 is a sectional view and a side view of another modified engaging element formed on the bail arm.
Figure 11:
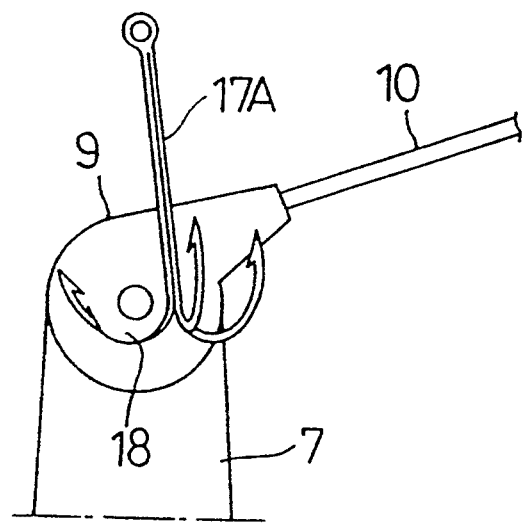

(b) As shown in FIGS. 10 and 11, a retainer surface 18A and a guide surface 18B together define an engaging element 18.

Figure 31:
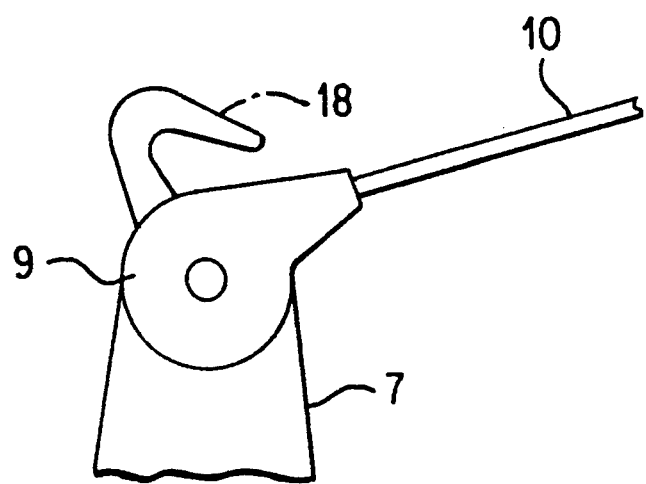
FIG. 31 is a side view of a modified engaging element.

(c) As shown in FIG. 31, an engaging element 18 is formed on a downstream position of the oscillatable arm 9 with respect to the direction of oscillation thereof.

According to the present invention, it is possible to form the engaging element on the first arm of the rotor (which includes the line roller). Further, the present invention is applicable also to a spinning reel having no switching control mechanism.

Another embodiment of the invention will be described next.

Figure 15:
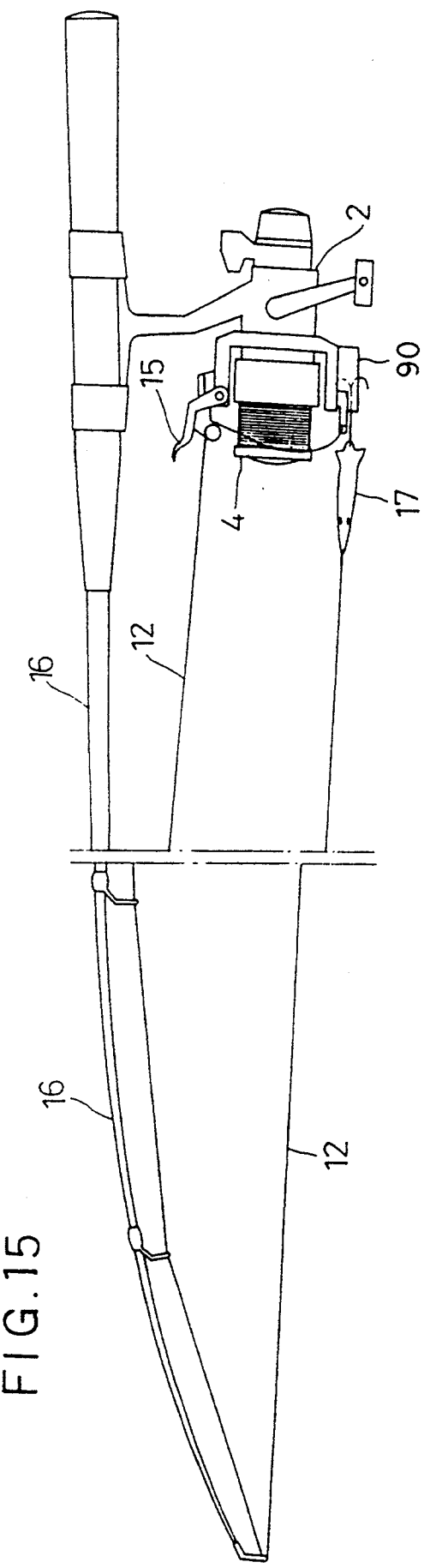
FIGS. 15 and 16 are side views showing a pre-casting state and a post-casting state, respectively.
Figure 16:
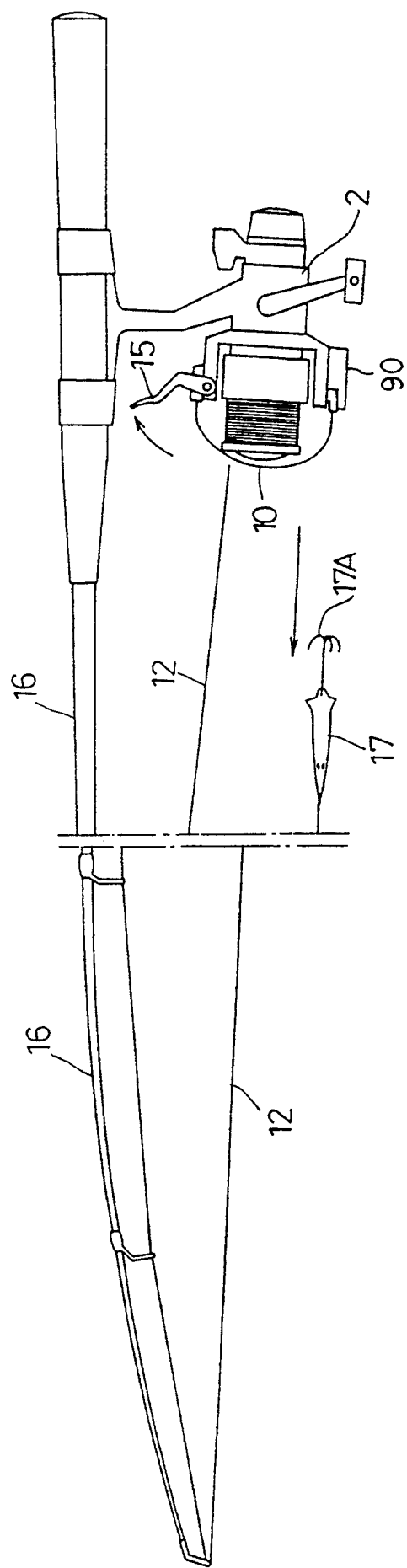
Figure 17:
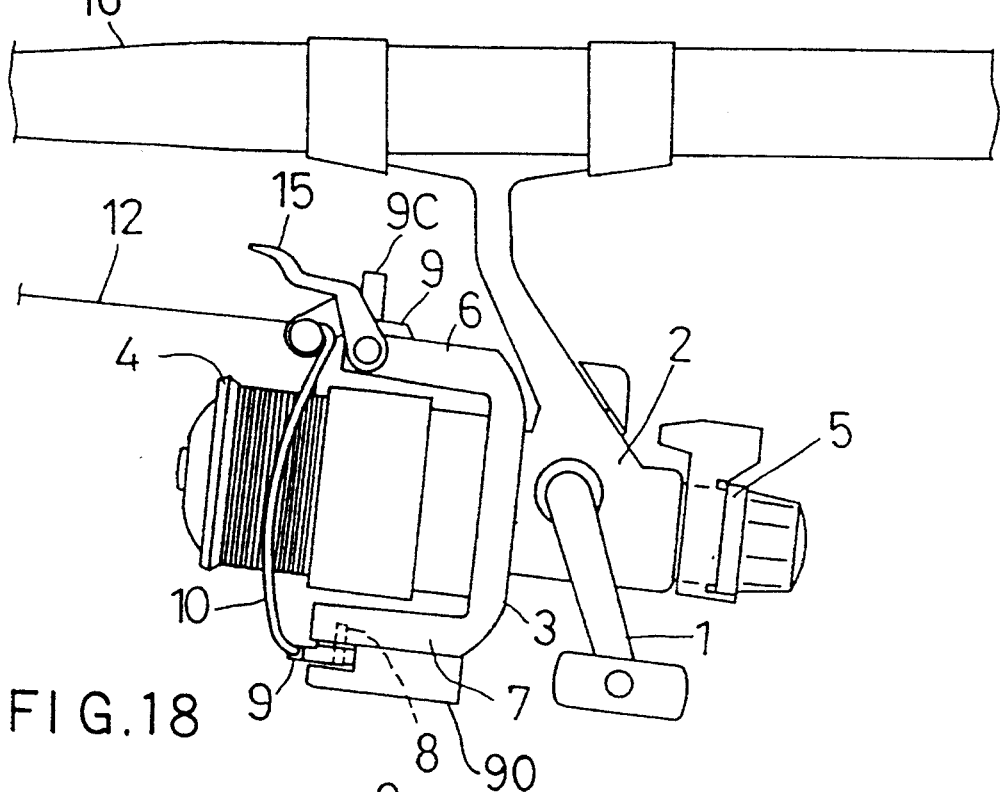
FIG. 17 is a side view of a spinning reel.
Figure 18:
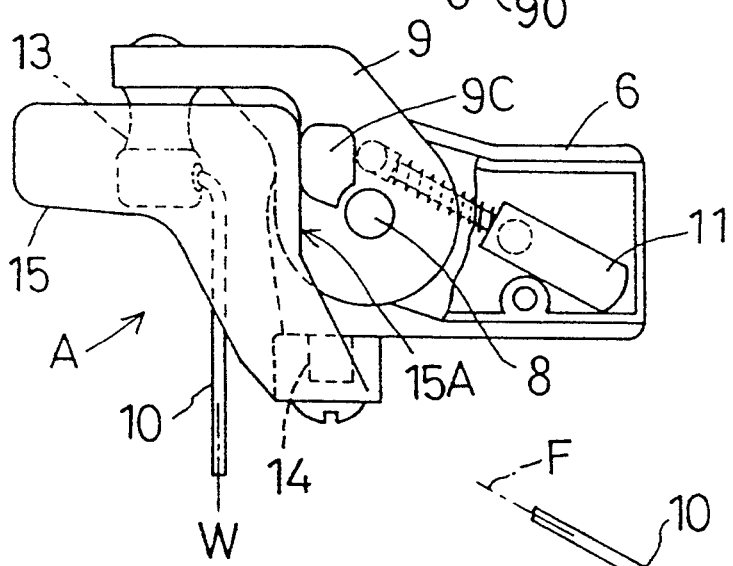
FIGS. 18 and 19 are plan views of a switching control mechanism in a pre-switching state and a post-switching state, respectively.
Figure 19:
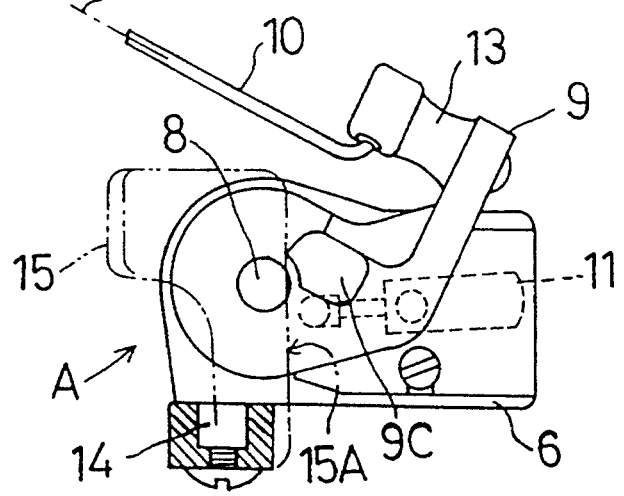

Referring to FIGS. 12 through 19, the engaging element 18 of this spinning reel is linked to an interlocking device B to be switchable with the bail arm 10 which has a housing 90 around it as shown in FIGS. 15-17.

The engaging element 18 has a predetermined oscillating range between an engaging position to hold the hook 17A of the lure 17 with a forward tension acting on the lure 17 and a release position to release the hook 17A of the lure 17 forwardly. The engaging element 18 is operatively connected to the interlocking device B to be maintained in the engaging position when the bail arm 10 is set to the line winding position W and switched to the release position when the bail arm 10 is switched to the line freeing position F.

The interlocking device B includes a rack gear 19 slidable with oscillations of the oscillatable arm 9, and a pinion gear 20 meshed with the rack gear 19. The rack gear 19 has an end 19A connected to a pin 9P of the oscillatable arm 9, while the engaging element 18 has a proximal end 18C acting as axis of the pinion gear 20.

For using this engaging element 18 in aid of casting, as shown in FIG. 15, the hook 17A is engaged with the engaging element 18 with the lure rod 16 elastically deformed in a bending direction and the fishing line 12 under tension. In this state, the tip end of the lure rod 16 is directed toward a target point, and the lever 15 of the switching control mechanism A is raised. Consequently, as shown in FIG. 16, when the bail arm 10 is switched from the winding position W to the freeing position F, the lure 17 becomes disengaged to set the fishing line 12 free. The lure 17 is then thrown substantially straight forward.

In this embodiment, therefore, the engaging element 18 formed on the reel allows casting to be carried out utilizing the elasticity of the fishing rod 16 without swinging the fishing rod 16.

This spinning reel with the very simple improvement, i.e. formation of the engaging element, is capable of aiding casting to a target point even in a situation where it is difficult to swing the fishing rod.

In particular, it is possible with this embodiment to adjust a casting distance by adjusting a bending amount of the fishing rod. Further, this embodiment enables a beginner to handle the fishing rod with ease since casting describes a linear locus longitudinally of the rod. It is also possible to select timing of movement between the bail arm and engaging element by means of the interlocking device.

The above embodiment may be modified as set out in paragraphs (a) through (d) below.

Figure 20:
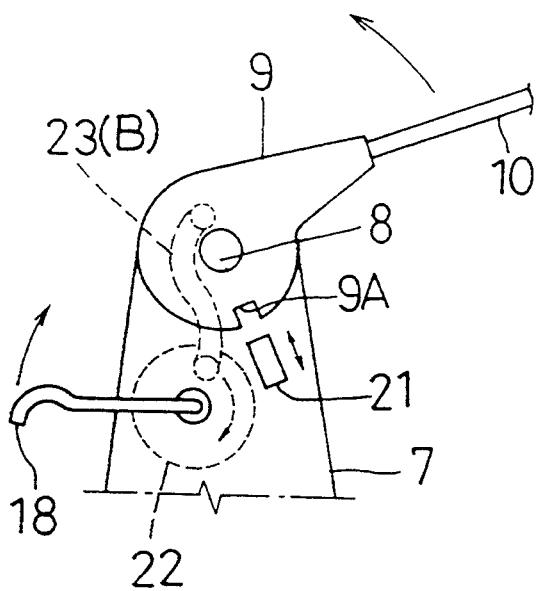
FIGS. 20, 21 and 22 are views showing modified interlocking devices, respectively.

(a) As shown in FIG. 20, an engaging element 18 is provided to be oscillatable about an axis parallel to the axis 8 of the oscillatable arm 9. The engaging element 18 has a disk 22 formed at a proximal end thereof, and a rod 23 extends between the disk 22 and the oscillatable arm 9 to act as the interlocking device B.

This modified example includes a lock piece 21 slidable to engage a recess 9A defined in the oscillatable arm 9, in order to avoid inadvertent casting due to an external shock or the like occurring while the engaging element engages the lure.

(b) A gear (not shown) is provided between the oscillatable arm 9 and disk 22 to function as in the modification (a) above.

Figure 21:
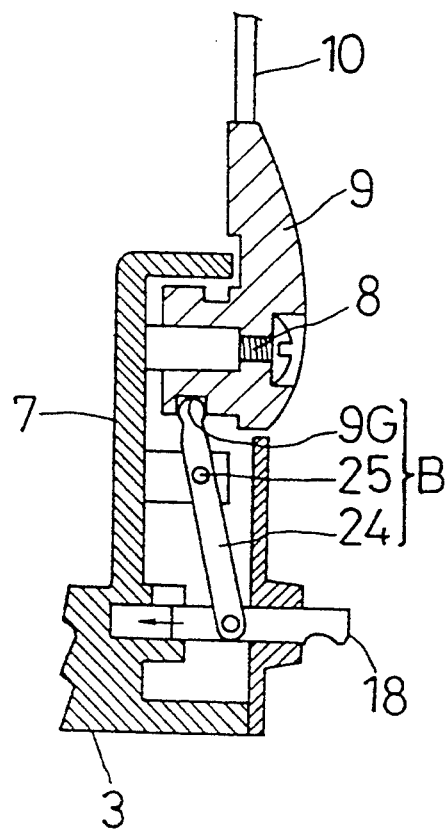

(c) As shown in FIG. 21, an engaging element 18 is provided to be slidable along an axis parallel to the axis 8 of the oscillatable arm 9. An oscillatable arm member 24 is oscillatable on an axis 25 under guidance by a cam groove 9G formed in the oscillatable arm 9. This oscillatable arm member 24 acts as an interlocking device B with an oscillating end thereof connected to the engaging element 18.

Figure 22:
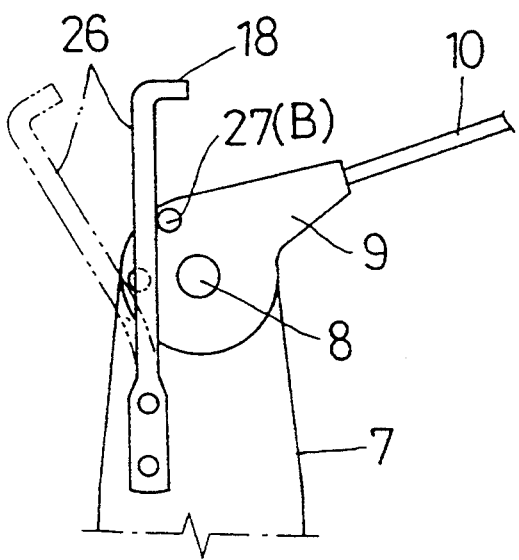

(d) As shown in FIG. 22, a spring 26 has one end fixed to the second arm 7 of the rotor 3, and the other, free end bent to act as an engaging element 18. The oscillatable arm 9 includes a pin 27 to act as an interlocking device B for contacting the spring 26 to switch positions of the engaging element 18.

Figure 26:
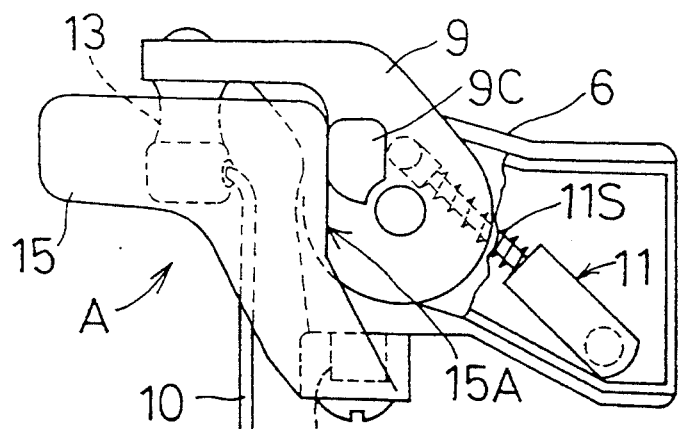
FIGS. 26 and 27 are plan views of a switching control mechanism in a pre-switching state and a post-switching state, respectively.
Figure 27:
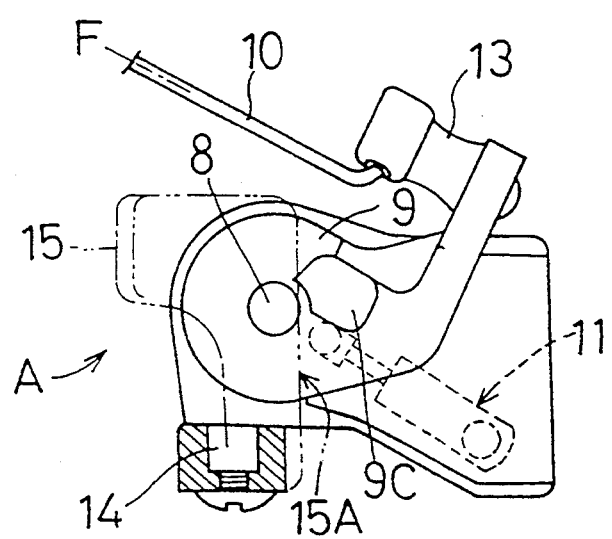

A spinning reel in a further embodiment of the invention will be described with reference to FIGS. 23 through 27. As shown in FIG. 26, the first arm 6 of this reel contains an urging device 11 having a compression spring 11S for urging the bail arm 10 to the line winding position W. The first arm 6 further includes a switching control mechanism A for switching the bail arm 10 to the line freeing position F. The oscillatable arm 9 of this first arm 6 has a line roller 13 for guiding the fishing line 12.

Figure 23:
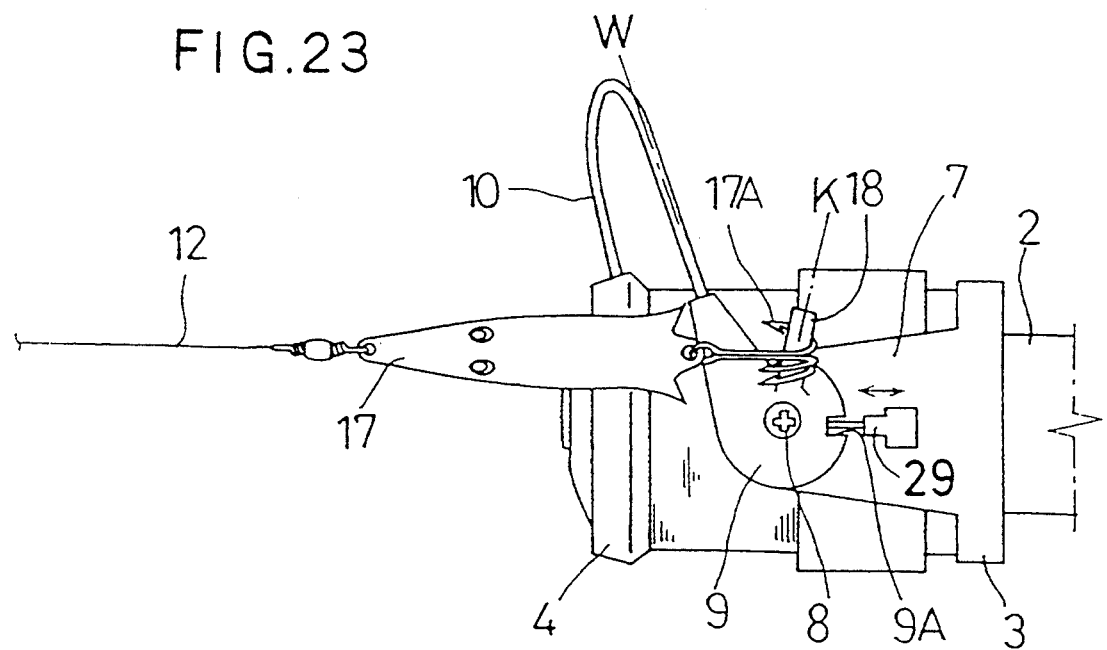
FIG. 23 is a view showing a spinning reel in a further embodiment including an engaging element with a bail arm in a line winding position.
Figure 24:
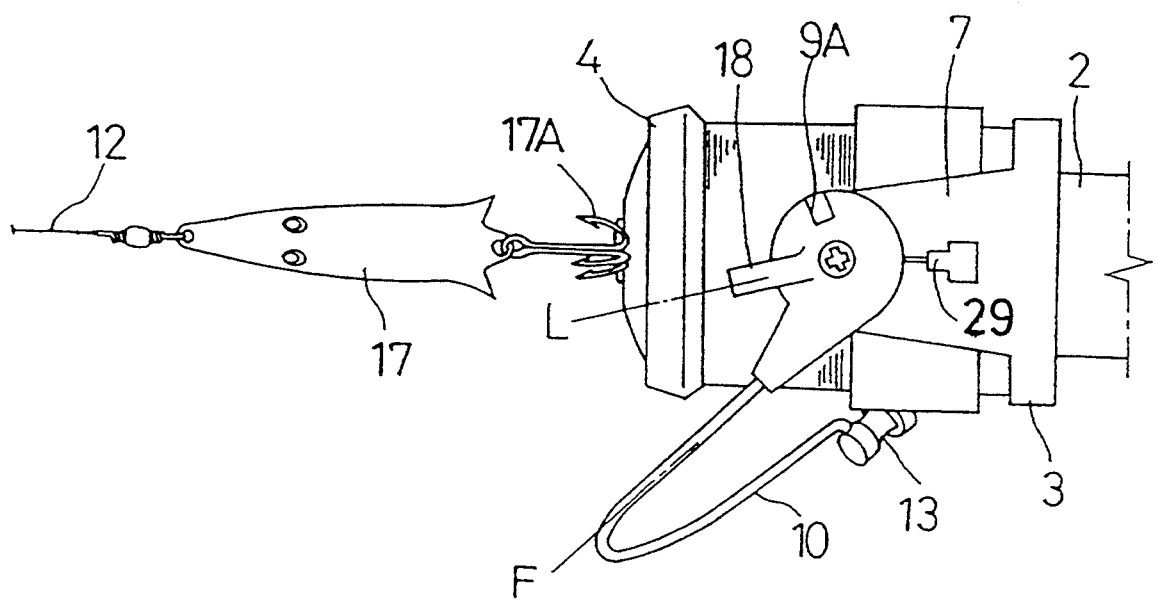
FIG. 24 is a view showing the engaging element with the bail arm in a line freeing position.
Figure 25:
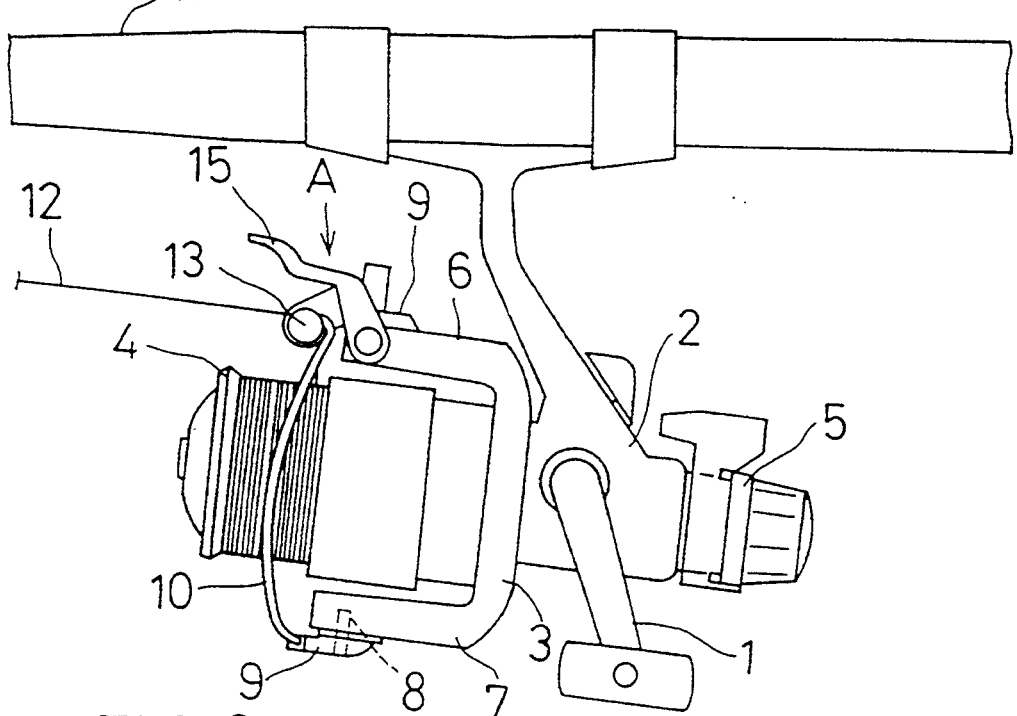
FIG. 25 is a side view of a spinning reel in the further embodiment.

When the bail arm 10 is set to the winding position W, as shown in FIG. 23, the engaging element 18 holds the hook 17A of the lure 17 in an engaging position K, with a forward tension acting on the lure 17. When the bail arm 10 is set to the freeing position F, as shown in FIG. 24, the oscillatable arm 9 is movable to a release position L to release the hook 17A of the lure 17 forwardly. For using this engaging element 18 in aid of casting, action is taken as shown in FIGS. 3 and 4 illustrating the first embodiment.

After the lure is thrown as above, the bail arm 10 oscillates toward the winding position W under the force of the urging device 11 only by loosening the lever 15 of the switching control mechanism A. With an appropriately selected amount of this loosening, the bail arm 10 contacts the fishing line 12 unwound from the spool 4, to facilitate adjustment of a casting distance and prevention of line slacking. After the lure 17 hits a target point on the water, the lever 15 may just be released to allow the bail arm 10 to return to the winding position W. Thus, reeling may be started quickly to retrieve the lure.

Figure 28:
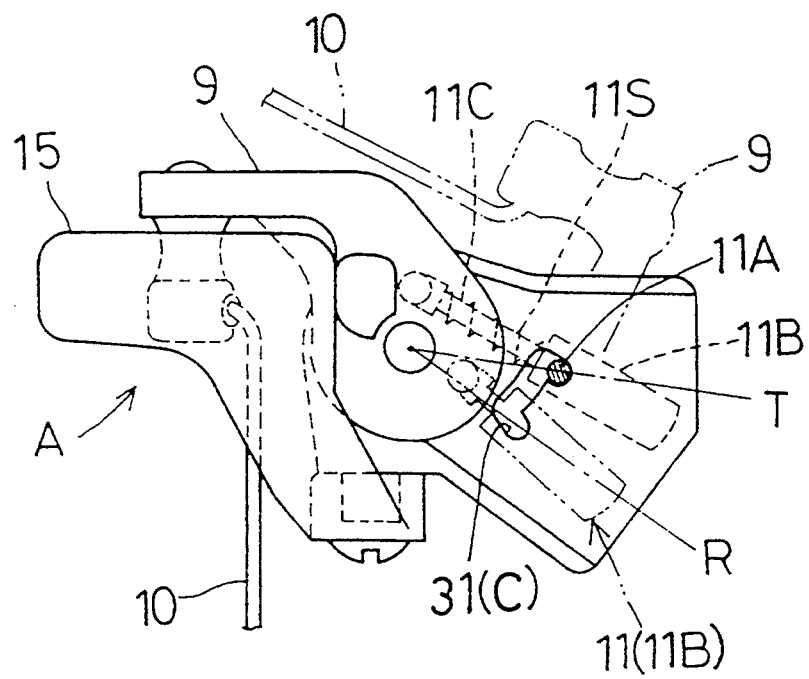
FIGS. 28 and 29 are plan views of modified function switching mechanisms.

This embodiment may be modified as follows:

(a) As shown in FIG. 28, an urging device 11 includes an oscillatable member 11B oscillatable about an axis 11A, and a projection 11C projecting from the oscillatable member 11B under the force of a spring 11S. A groove 31 acts as a function switching mechanism C for switching the axis 11A between a toggle position T and a restoring position R. When the axis 11A is in the toggle position T, the urging device 11 performs toggle action to maintain the bail arm 10 in the winding position W or freeing position F. When the axis 11A is in the restoring position, the urging device 11 constantly urges the bail arm 10 to the winding position W.

Figure 29:
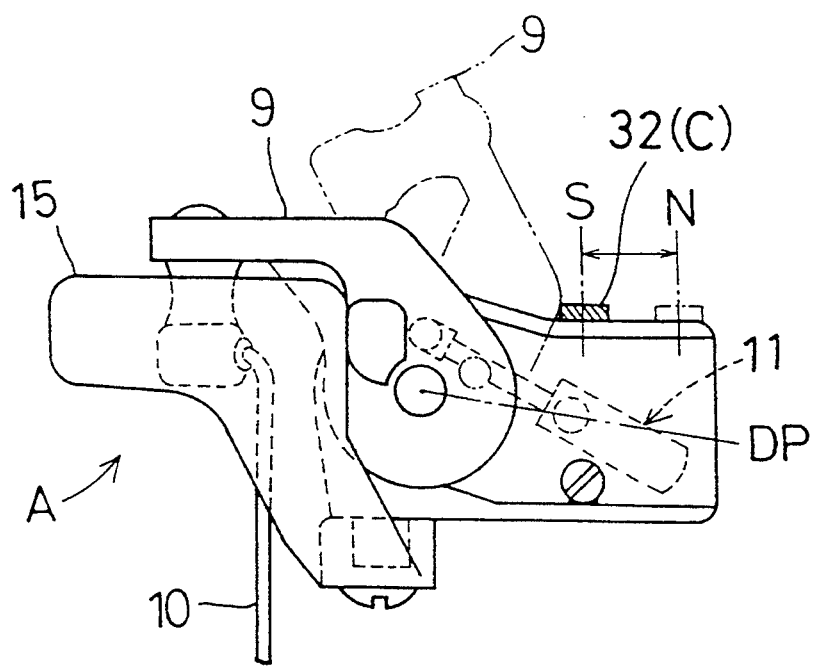

(b) As shown in FIG. 29, the urging device 11 is constructed to perform the toggle action as above, and the function switching mechanism C includes a stopper 32 switchable between an operative position S and an inoperative position N. In the operative position S, the stopper 32 is operable, when the switching control mechanism A causes the bail arm 10 to move toward the freeing position F, to prevent the urging direction of the urging device 11 from moving past a dead point DP while allowing oscillation of the bail arm 10 to an extent of casting the lure 17 and freeing the fishing line 12.

Figure 30:
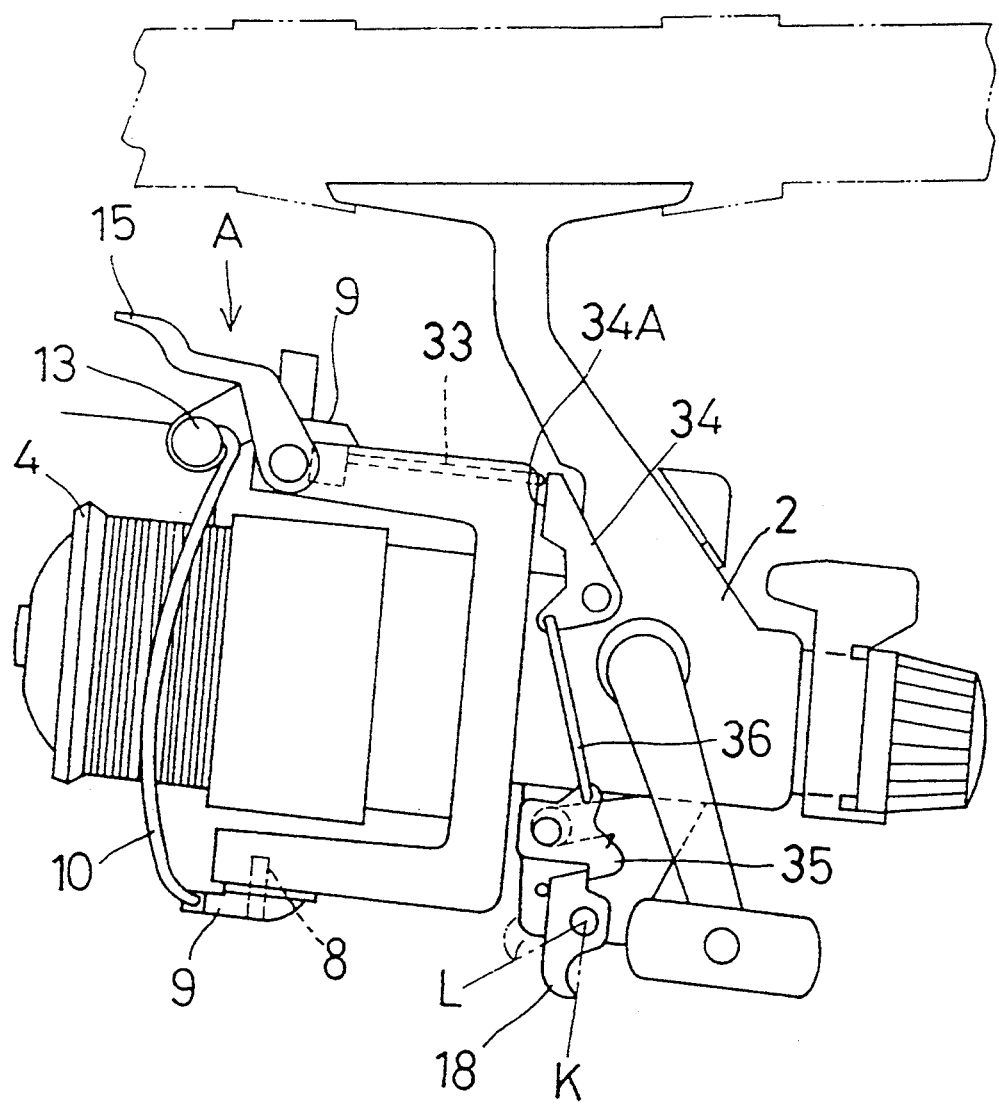
FIG. 30 is a side view of a modified interlocking system.

(c) As shown in FIG. 30, an engaging element 18 is attached to the reel body 2 and interlocked to the oscillatable arm 9 of the first arm 6. The interlocking system includes a pin 33 projecting rearwardly when the oscillatable arm 9 is oscillated toward the release position, an arm 34 having a contact portion 34A for receiving a pressing force from the projecting pin 33 and converting this force to a swinging force, a lock element 35 connected to the arm 34 through a rod 36 to release the engaging element 18.

Further, the engaging element may be formed integral with the bail arm. The constructions of the urging device and engaging element are variable in many ways.

Like reference numerals are used to identify like components throughout the described embodiments.

It is also in accordance with the present invention to modify the construction and operation of the interlocking device, e.g. an engaging element formed of two openable and closable parts, a mechanism for electrically operating the engaging element, or a mechanism enabling adjustment of operating timing of the engaging element.

What is claimed is:

1. A spinning reel comprising:
   a reel body;
   a pair of arms including a first arm and a second arm formed on a rotor disposed at a forward portion of said reel body;
   an oscillatable arm attached to at least one of said first and second arms;
   a bail arm extending from said oscillatable arm, said bail arm being switchable between a line winding position and a line freeing position; and
   a bait engaging element formed on said oscillatable arm, said bait engaging element operating to prevent a bait engaged therewith from moving in a forward direction when said bail arm is set to said line winding position, and for allowing said bait to move in said forward direction when said bail arm is set to said line freeing position.

2. A spinning reel comprising:
   a reel body;
   a pair of arms including a first arm and a second arm formed on a rotor disposed at a forward portion of said reel body;
   an oscillatable arm attached to at least one of said first and second arms;
   a bail arm extending from said oscillating arm, said bail arm being switchable between a line winding position and a line freeing position; and wherein said one arm includes:
   a rack gear with an end connected to said oscillatable arm, said rack gear being displaceable in a forward direction and a rearward direction in accordance with the oscillation of said oscillatable arm between said line winding position and said line freeing direction;

a pinion gear rotatably engaged with said rack gear to rotate in accordance with the displacement of said rack gear;

a bait engaging element mounted on said pinion gear, said bait engaging element having an end that is bent into the shape of a hook, said bait engaging element operating to prevent a bait engaged therewith from moving in a forward direction when said bail arm is set to said line winding position, and for allowing said bait to move in said forward direction when said bail arm is set to said line freeing position.

* * * * *